US009083782B2

(12) United States Patent
Tetelbaum et al.

(10) Patent No.: US 9,083,782 B2
(45) Date of Patent: Jul. 14, 2015

(54) DUAL BEAMFORM AUDIO ECHO REDUCTION

(71) Applicant: Research in Motion Limited, Waterloo (CA)

(72) Inventors: Michael Tetelbaum, Ottawa (CA); James David Gordy, Ottawa (CA); Brady Nicholas Laska, Arnprior (CA); Chris Forrester, Kitchener (CA); Malay Gupta, Canton, OH (US); Sylvain Angrignon, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 135 days.

(21) Appl. No.: 13/889,382

(22) Filed: May 8, 2013

(65) Prior Publication Data

US 2014/0335917 A1    Nov. 13, 2014

(51) Int. Cl.
| | | |
|---|---|---|
| *H04M 1/00* | (2006.01) | |
| *H04B 1/38* | (2006.01) | |
| *H04M 9/08* | (2006.01) | |
| *H04M 1/60* | (2006.01) | |

(52) U.S. Cl.
CPC ............ *H04M 9/082* (2013.01); *H04M 1/6041* (2013.01)

(58) Field of Classification Search
USPC ............ 455/500, 501, 63.1, 67.11, 67.13, 68, 455/69, 569.1, 570, 295, 296; 379/406.01, 379/406.03, 406.05, 406.06, 406.07; 381/71.1, 92, 94.1, 95, 66
See application file for complete search history.

(56) References Cited

U.S. PATENT DOCUMENTS

| | | | |
|---|---|---|---|
| 4,718,096 A | 1/1988 | Meisel | |
| 5,796,819 A | 8/1998 | Romesburg | |
| 6,249,581 B1 * | 6/2001 | Kok | 379/406.16 |
| 6,593,914 B1 | 7/2003 | Nuovo et al. | |
| 6,725,057 B1 | 4/2004 | Boyle | |
| 7,577,260 B1 * | 8/2009 | Hooley et al. | 381/77 |
| 7,680,465 B2 | 3/2010 | Zad-Issa | |
| 7,728,870 B2 | 6/2010 | Rudnik et al. | |
| 7,916,849 B2 | 3/2011 | Bathurst et al. | |
| 7,991,167 B2 | 8/2011 | Oxford | |
| 8,031,853 B2 | 10/2011 | Bathurst et al. | |
| 8,090,374 B2 | 1/2012 | Rezvani et al. | |
| 8,885,815 B1 * | 11/2014 | Velusamy et al. | 379/406.03 |
| 2002/0015500 A1 | 2/2002 | Belt et al. | |
| 2005/0018836 A1 * | 1/2005 | Beaucoup et al. | 379/406.01 |

(Continued)

OTHER PUBLICATIONS

Wimmer, R., et al., "HandSense—Discriminating Different Ways of Grasping and Holding a Tangible User Interface," TEI 2009, Feb. 16-18, 2009, Cambridge, UK, Copyright 2009 ACM.

(Continued)

*Primary Examiner* — Tuan A Tran
(74) *Attorney, Agent, or Firm* — Jon Gibbons; Fleit Gibbons Gutman Bongini & Bianco P.L.

(57) ABSTRACT

A telephonic device having a speakerphone function has a loudspeaker and a plurality of microphones. The plurality of microphones are coupled to a plurality of beamformers which produce a first beamform having a spatial null in the direction of the loudspeaker and a second beamform having a spatial null in the direction of near-end signals. The two beamforms are then processed to facilitate echo reduction. By comparing the beamform powers, a state of double-talk can be determined and the determination can be used to enhance echo reduction associated with speakerphone functionality.

20 Claims, 5 Drawing Sheets

(56) References Cited

U.S. PATENT DOCUMENTS

| | | |
|---|---|---|
| 2005/0038442 A1 | 2/2005 | Freeman |
| 2005/0047611 A1 | 3/2005 | Mao |
| 2005/0074129 A1 | 4/2005 | Fan |
| 2005/0088981 A1 | 4/2005 | Woodruff et al. |
| 2005/0141731 A1 | 6/2005 | Hamalainen |
| 2006/0262943 A1 | 11/2006 | Oxford |
| 2007/0038442 A1 | 2/2007 | Visser et al. |
| 2007/0230712 A1 | 10/2007 | Belt et al. |
| 2008/0112569 A1 | 5/2008 | Asada |
| 2008/0146289 A1 | 6/2008 | Korneluk et al. |
| 2008/0159555 A1 | 7/2008 | Asada et al. |
| 2009/0034752 A1 | 2/2009 | Zhang et al. |
| 2009/0268920 A1 | 10/2009 | Fan |
| 2010/0022283 A1 | 1/2010 | Terlizzi |
| 2010/0081487 A1 | 4/2010 | Chen et al. |
| 2010/0123785 A1 | 5/2010 | Chen et al. |
| 2010/0172510 A1 | 7/2010 | Juvonen |
| 2010/0195838 A1 | 8/2010 | Bright |
| 2010/0217590 A1 | 8/2010 | Nemer et al. |
| 2011/0038486 A1* | 2/2011 | Beaucoup ............. 381/56 |
| 2011/0142247 A1 | 6/2011 | Fellers et al. |
| 2011/0293103 A1 | 12/2011 | Park et al. |
| 2011/0300806 A1 | 12/2011 | Lindahl et al. |
| 2011/0317041 A1 | 12/2011 | Zurek et al. |
| 2012/0027219 A1 | 2/2012 | Kale et al. |
| 2012/0243698 A1* | 9/2012 | Elko et al. ............. 381/66 |
| 2013/0039503 A1 | 2/2013 | Beaucoup et al. |
| 2013/0039504 A1 | 2/2013 | Pandey et al. |

OTHER PUBLICATIONS

Jeong, J., "Analysis of System Identification and Modified Application to Two-Microphone Speech Enhancement," International Journal of Circuits, Systems and Signal Processing, Issue 2, vol. 3, 2009.

Kellermann, W., "Integrating Acoustic Echo Cancellation with Adaptive Beamforming Microphone Arrays," Forum Acusticum, Berlin, Mar. 14-19, 1999, Telecommunications Institute I, University Erlangen-Nuremberg, Germany.

EESR dated Jul. 30, 2012 for EP 12159745.

EESR dated Jul. 25, 2013 for European Application No. 13167071.3.

* cited by examiner

DUAL BEAMFORM AUDIO ECHO REDUCTION

The present disclosure generally relates to audio signal processing and more particularly to controlling audio echo reduction processing using audio beamforms.

BACKGROUND

Handheld audio devices, such as telephone handsets, speakerphones or other audio pick-up devices, are able to use two or more microphones to perform audio processing such as echo cancellation upon audio signals received by a microphone positioned on the device to detect a user's spoken voice. Echo results from smaller and smaller phone devices mandating placement of microphones close to the telephone loudspeaker, particularly when the telephone is used in a hands-free or speakerphone mode. Sound is generated at a far-end audio source, such as the voice of the person at the other end of the phone call. This person is sometimes called the far-end talker, who speaks into a far-end telephone or a far-end device. This sound is annunciated at the loudspeaker. The sound generated by the loudspeaker is then received by the microphone or microphones of the speakerphone, resulting in a potential echo signal. Echo reduction technology, including echo cancellation and echo suppression, has been developed that intends to resolve the undesirable echo by subtracting the audio signal generated at the loudspeaker from the sound signal received by the microphone.

Speakerphones with multiple microphones intend to improve the quality of the near-end audio signals generated close to the speakerphone, such as voice sounds annunciated by one or more callers close to the speakerphone. Beamforming technology has been developed that intends to produce audio beams for enhancing the reception of audio from more desirable directions, thereby enhancing the quality of the near-end audio transmitted by the speakerphone to far-end telephones. Beamforms also have a characteristic of a spatial null where sounds in other directions are attenuated. However, in a double-talk situation where the near-end audio has a level similar to echo audio from the loudspeaker, echo reduction becomes complicated because the reflected echo and near-end audio may be more difficult for an audio signal processor to distinguish. Echo cancellation and echo suppression in a double-talk environment enhances the telephone conversation experience.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
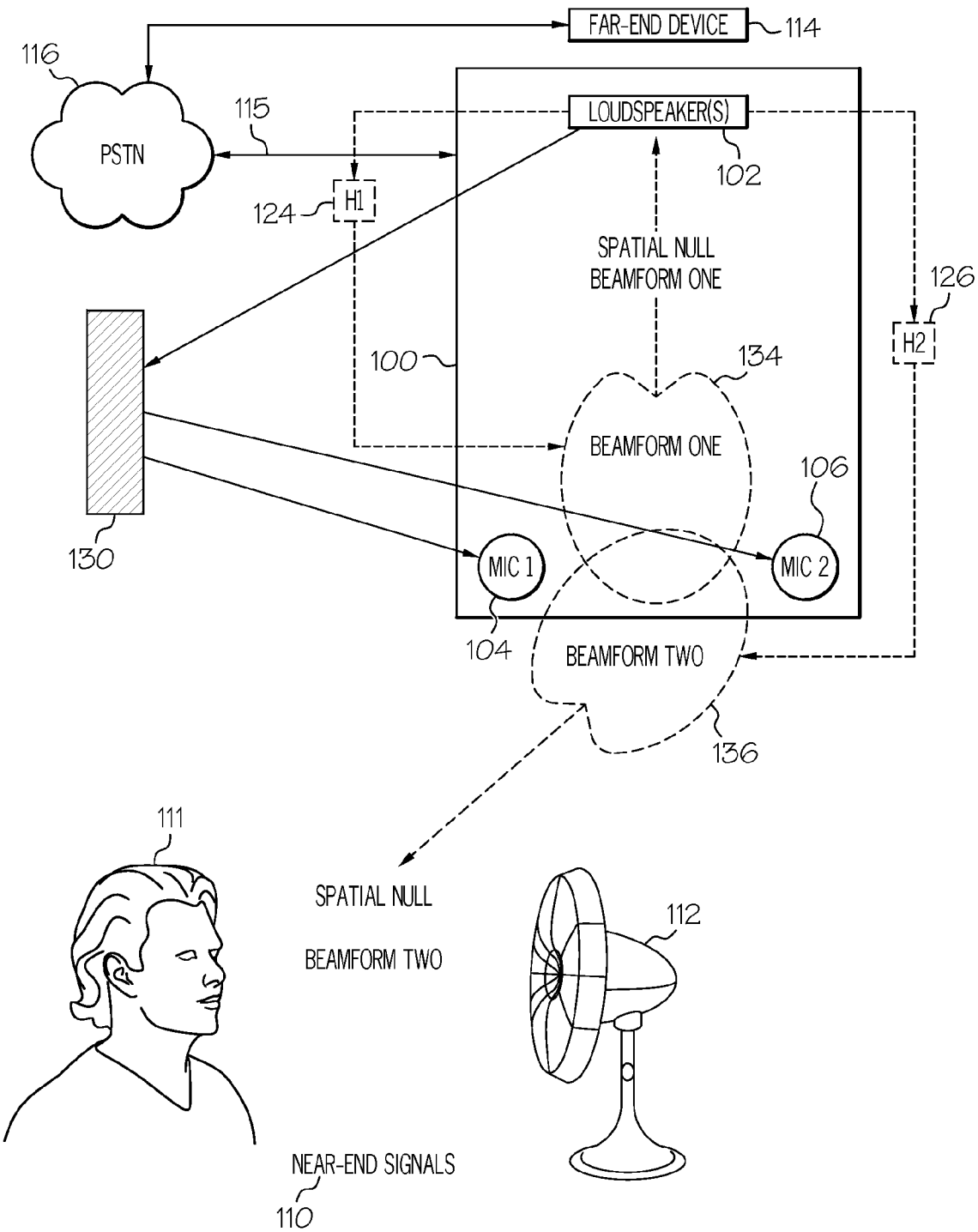
FIG. 1 illustrates a representative system, including a telephone device, for implementing a telephone conversation.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, shaped, designed or otherwise configured to be carried and operated while being held in a human hand.

Described below are systems and methods that perform more effective audio improvement processing, on a handheld device, of echo signals picked up by a device having a speakerphone function. One of the challenges of a speakerphone implementation is the detection of a double-talk condition where sound received by the speakerphone's microphone has a far-end audio level generated by the loudspeaker that is close to the level of the near-end audio source. In this situation it is difficult to determine whether or not to engage echo reduction functionality. Improper engagement of echo reduction can produce undesirable audio artifacts including an undesirable echo heard at either the far-end or the near-end telephone. In one example, use of a microphone array to create dual audio beamforms. This approach has the advantage of using signal processing to create two different beamforms from a single array of microphones. The first beamform has a spatial null in the direction of the loudspeaker, and the second beamform has a spatial null in the direction of the near-end signals enhances. This enhances the determination of the double-talk condition when the near-end and loudspeaker audio levels are similar. The first beam has a reduce loudspeaker component, or enhanced loudspeaker rejection, and the second beam has a reduced near-end signal component, or enhanced near-end signal rejection. Both beams can then be processed to more advantageously determine a double-talk condition and engage the echo reduction circuitry more effectively.

In one example, a device such as a portable cellular phone has a speakerphone operating mode for facilitating a telephone call between a near-end audio source and a far-end telephonic device. When the near-end and far-end devices are coupled through a network such a network including the public switched telephone network, a phone conversation can be made, with the near-end component being conducted using a speakerphone functionality. In this example, the portable cellular phone comprises a loudspeaker affixed to the cellular phone for annunciating the far-end audio signals from the far-end telephonic device and a plurality of microphones affixed to the cellular phone for receiving near-end audio signals from the near-end audio source and for receiving an echo signal generated by the loudspeaker. Also included is an audio processor which includes a first beamformer coupled to the plurality of microphones for forming a first audio beam having a spatial null in the loudspeaker direction and a second beamformer coupled to the plurality of microphones for forming a second audio beam having a spatial null in an at least one near-end signal direction. A double-talk detector within the audio processor analyzes the first audio beam and a second audio beam and generates an echo reduction control signal in response to a first audio beam power level being greater than a product of a second audio power level and a threshold. The threshold being a function of the ratio of the estimated echo transfer function between the loudspeaker and the first beam (H1) and between the loudspeaker and the second audio beam (H2). The audio processor also includes an echo reducer, coupled to at least one of the plurality of microphones (or beamforms) which receives a combination of the echo signal and the near end audio signals and operates to reduce the echo signal in response to the echo reduction control signal. The portable cellular phone also includes a wireless telephonic interface for coupling to the far-end telephonic device.

In another example, a computer program product processes audio signals. The computer program product comprises a computer readable storage medium having computer readable program code embodied therewith. The computer readable program code comprises instructions for receiving a plurality of audio inputs from a corresponding plurality of microphones affixed to a telephone device. The telephone device also has a loudspeaker. There are also instructions for forming a first audio beam from the plurality of audio inputs, the first audio beam having a spatial null in the loudspeaker direction, and for forming a second audio beam from the plurality of audio inputs, the second audio beam having a spatial null in at least one near-end signal direction. The instructions further are for analyzing the first audio beam and the second audio beam and controlling a modification of an audio signal received by at least one of the plurality of microphones in response to the analyzing. Modification of the audio signal includes reducing an echo signal produced by the loudspeaker.

In another example, an apparatus comprises a plurality of beamformers coupled to a plurality of microphones affixed to a telephone device having a loudspeaker. A first of the plurality of beamformers is coupled to the plurality of microphones for forming a first audio beam having a spatial null in the loudspeaker direction, a second of the plurality of beamformers is coupled to the plurality of microphones for forming a second audio beam having a spatial null in an at least one near-end signal direction. The apparatus also includes a controller for analyzing the first audio beam and the second audio beam and for controlling a modification of an audio signal received by at least one of the plurality of microphones in response to the analysis.

In another example, a method comprises receiving a plurality of audio inputs from a corresponding plurality of microphones affixed to a telephone device having a loudspeaker and forming a first audio beam from the plurality of audio inputs, the first audio beam having a spatial null in the loudspeaker direction. The method also comprises forming a second audio beam from the plurality of audio inputs, the second audio beam having a spatial null in at least one near-end signal direction and analyzing the first audio beam and the second audio beam. The method also includes controlling a modification of an audio signal received by at least one of the plurality of microphones in response to the analyzing is also performed in the method. The modification to the audio signal includes reducing an echo signal generated by the loudspeaker.

FIG. 1 illustrates a representative system, including a telephone device, for implementing a telephone conversation. In FIG. 1, the telephone device is embodied as a speakerphone 100, for purposes of illustration. Speakerphone 100 includes a loudspeaker(s) 102 affixed to the speakerphone and at least a first microphone 104 and a second microphone 106 included with a plurality of microphones which may number up to eight or more microphones. Loudspeaker(s) 102 may be comprised of one or more loudspeakers to enhance audio quality. While only a single loudspeaker is shown, multiple loudspeakers may provide for frequency or spatial diversity or both or stereophonic production of audio. Frequency diversity is used where the speakers have differing frequency ranges. Spatial diversity is where speakers are located in differing areas to provide for better production of sound. The microphones are shown to be affixed to the speakerphone, in other examples, the one or more of the microphones may be remote, and not affixed to the speakerphone.

The telephone device (embodied as speakerphone 100) may include any device that can function as a terminal for telephony (or that is adapted to facilitate telephonic communications), which may include telephony by wired or wireless channels or combinations thereof. A telephone device may include any of several kinds of customer-premises equipment or customer-provided equipment (CPE), and may include, for example, a portable telephone, a walkie-talkie, cell phone, smartphone, super phone, a desktop or conference room telephone, or a telephone application or process running within a personal digital assistant, tablet, laptop, personal computer. Thus, speakerphone 100 need not be limited to a single functioning speakerphone and may also have a selectable handset mode where the user's head is in close proximity to the microphones and/or speaker. Speaker and microphone placement may vary depending on the implementation of the speakerphone. Digital beamforming has on advantage of allowing the speakerphone to be incorporated in a number of varying environments, such as an automobile, a conference room or a desk top speakerphone where microphone and speaker placement may be varied in response to the environment, the intended application or other factors. In another benefit, additional beamforms may be produced from the same microphones. In one example an additional beamform (s) having additional gain directed toward a near-end talker(s) can enhance the reception of the desired audio signal and can provide a higher quality audio signal to the far-end equipment.

The microphones receive near-end audio signals 110 from desired sources such as one or more persons or talkers 111 (who may also be called near-end talkers) participating in a telephone conversation. Near-end signals may also include noise signals from sources such as fan 112. Near-end audio signals 110 are exchanged with far-end audio signals from far-end device 114 as part of a telephone conversation. Far-end audio signals are reproduced by loudspeaker 102 in order to be heard by persons 111. It is generally desirable that far-end audio signals, once they reach the near-end, stay at the near-end; it is generally undesirable that far-end audio signals reproduced by loudspeaker 102 be sent back to the far-end.

The telephone conversation in this example is conducted through the Public Switched Telephone Network (PSTN) 116 via coupling 115. The telephone conversation may be conducted through any other means for facilitating telephonic communications and need not be limited to the PSTN. Other means besides the PSTN include point to point or networked wired or wireless couplings such as USB, Ethernet, Bluetooth, WiFi, or Zigbee, local phone networks, local area networks, wide area networks, private networks, virtual private networks, intranets and the Internet.

Beamform one, 134, is created by processing signals from the plurality of microphones and has a spatial null directed toward loudspeaker 102 (that is, the spatial null of beamform one, 134, is pointed or oriented in the loudspeaker direction). If loudspeaker 102 comprises more than one loudspeaker affixed to the housing, then beamform one can be created with multiple nulls in the direction of each of the speakers. If the speakers have frequency diversity, the spatial null locations can be frequency dependent corresponding to the frequency speaker. For example, if the first speaker is a high frequency speaker and the second speaker is a low frequency speaker located in a different place in the housing, then beamform one can be created with a high frequency null in the direction of the first speaker and a low frequency null in the direction of the second speaker. Beamform two, 136, is also created by processing signals from the microphones and has a spatial null directed toward near-end signals 110. The spatial null of beamform one results in an area of weak reception around the loudspeaker and the spatial null of beamform two results in an area of weak reception around the near-end signals.

The microphones not only receive near-end signals 110 but also receive echo signals from loudspeaker 102. The echo signals are also included in beamform one and beamform two. The Echo Return Loss (ERL) between the loudspeaker and beamform one corresponds to an estimated transfer function "H1" 124, and the ERL between the loudspeaker and beamform two corresponds to an estimated transfer function "H2", 126. ERL is a function known to those familiar with the art and results from the acoustic coupling between the loudspeaker and the microphones and reflections from the surroundings acoustic environment 130. ERL estimation is a process known to those familiar with the art and can be at least partially predetermined and adaptively estimated on the fly as a smoothed power ratio of the loudspeaker and microphone signals during far-end single talk state, where far-end signals are generated by the loudspeaker. ERL can be estimated in full-band for an echo reduction system operating in time-domain or in each individual sub-band (or a frequency bin) for an echo reducer operating in sub-band or frequency domain. The ratio of the two echo frequency responses H1/H2 at each frequency band (or bin) driving the decision logic can also be more accurately estimated as a smoothed power ratio of the beamform one and beamform two during far-end single talk state. Estimating echo transfer function between the beams is particularly advantageous when echo contains non-linear components due to loudspeaker non-linearity, because those may not be accounted when H1 and H2 are estimated using the loudspeaker reference signal (i.e. the signal driving loudspeaker).

Figure 2:
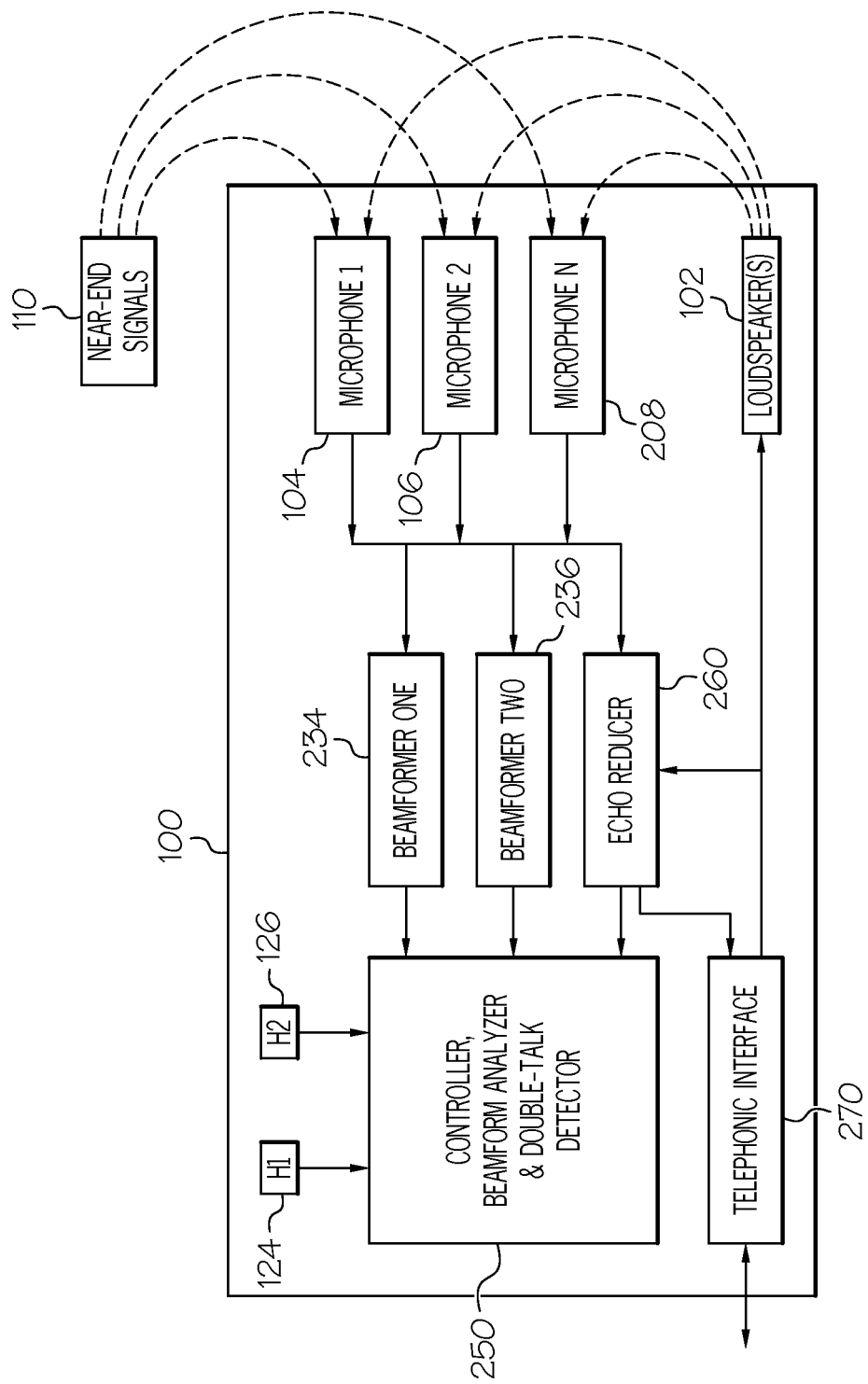
FIG. 2 illustrates a representative block diagram including an apparatus using a plurality of beamformers for controlling modification of an audio signal.

FIG. 2 illustrates a representative block diagram including an apparatus using a plurality of beamformers for controlling modification of an audio signal. A plurality of beamformers 234 and 236 are coupled to a plurality of microphones 104, 106 and 208 affixed to a telephone device 100 having a loudspeaker 102.

In general, modification of an audio signal includes receiving a raw audio signal as input and transforming, setting, changing or adjusting some quality or qualities of the audio signal. The microphones may be a combination of any transducer able to convert acoustic energy to electrical energy including but not limited to condenser, ceramic, carbon, piezoelectric, magnetic, fiber optic and MicroElectro-Mechanical System (MEMS) microphones and may be constructed to be directional or omnidirectional.

The microphones receive near-end audio signals 110 as well as echo signals from the loudspeaker 102. The first of the plurality of beamformers, beamformer one, 234, is coupled to the plurality of microphones 104, 106, and 208 and forms a first audio beam having a spatial null in the direction of the loudspeaker. An example of the first audio beam formed by beamformer one, 234 is shown as beamform one, 134 of FIG. 1. Beamformer one may create a steerable beam that may be directed towards the loudspeaker. The second of the plurality of beamformers, beamform two, 236, is coupled to the plurality of microphones 104, 106, and 208 and forms a second audio beam having a spatial null in the direction of the near-end signals 110. An example of the second audio beam formed by beamformer two, 236 is shown as beamform two, 136 of FIG. 1. Beamformer two may create a steerable beam having a spatial null that may be directed towards the near-end signals. If the near end signals are spread apart, for example if the fan 112 was some perpendicular distance from a talker 111, then a multiple spatial null beamform can be created with one spatial null directed towards noise source 112 and another spatial null directed towards talker 111. Also, as talker 111 moves during the telephone conversation beamformer two can steer the spatial null towards the moving talker in a manner known to those familiar with the art. It should also be appreciated that the shape for beamform one and the shape of beamform two need not be identical and the null directions need not be related and thus the plurality of beamforms may be steered independently.

The construction and operation of beamformer one and beamformer two are known to those familiar with the art (see for example, W. Kellermann, "Integrated Acoustic Echo Cancellation with Adaptive Beamforming Microphone Arrays" Forum Acusticum, Berlin, Germany, Mar. 14, 1999, H. Cox, R. M. Zeskind, and M. M. Owen, "Robust adaptive beamforming," IEEE Trans. Acoust., Speech, Signal Processing, vol. 35, pp. 1365-1376, October 1987, and O. L. Frost, III, "An algorithm for linearly constrained adaptive array processing," Proc. IEEE, vol. 60, pp. 926-935, August 1972) and involve processing and combining signals from the plurality of microphones to form a desired audio beam. The formation generally involves adjusting the magnitude and phase of microphone signals to form the desired beam either prior to on in combination with the combining of the microphone signals. The adjusting of the magnitude and phase may also be varied in response to the frequency of the microphone signals using either one broadband amplitude and phase adjustment, or multiple amplitude and phase adjustments based on frequency. While beamform one and beamform two may be formed with a multitude of microphones, they may also be formed with as few as two microphones. The two beamformers allows for the concurrent formation of beamform one and beamform two. Beamforms one and two may be adaptive and may be independently steerable such that the spatial nulls may be directed in an appropriate direction based on the speakerphone surroundings, or may be preset in predetermined directions, which may be independent of each other. It should be further appreciated that this example allows for both the concurrent formation of beamform one and beamform two may be performed, while also concurrently receiving of an audio signal to be modified for echo reduction based upon the processing of the beamforms where audio signals for beamform one, beamform two and the audio signal are simultaneously received on the plurality of microphones.

Controller 250 analyzes the output of the beamformers using ERL estimates H1, 124 and H2, 126 (or ERL between both beams, which is an echo transfer function H12) in order to control the modification of an audio signal received by at least one of the plurality of microphones. The modification will be described in more detail below. Controller 250 includes functions of a double-talk detector and a beamform analyzer and controls the operation of echo reducer 260, which may include an echo canceller, an echo suppressor and/or a residual echo suppressor. The construction and operation of echo reduction circuitry and processes are known to those familiar with the art (see for example Benesty et al., "Advances in Network and Acoustic Echo Cancellation" Berlin, Germany: Springer-Verlag, 2001). Echo reduction is performed on an audio signal received from at least one of the plurality of microphones or beams in response to audio signals provided to loudspeaker 102 by telephonic interface 270 and in response to signals received from the controller 250, the signals including an echo reduction control signal. The telephonic interface is known to those familiar with the art and may include any of the aforementioned wired and wireless interfaces for facilitation a telephone conversation. The controller 250 and the echo reducer 260 may be comprised within an integrated circuit which may include a processor such as Digital Signal Processor (DSP) executing program code instructions, which may be stored on a computer readable storage medium having computer readable program code embodied therewith, the computer readable program code comprising instructions for implementing at least portions of the controller or echo suppressor. The controller 250 and the echo reducer 260 may be at least partially comprised within an Application Specific Integrated Circuit (ASIC), a Field Programmable Array (FPGA), or semi-custom or custom designed circuit for implementing at least a portion of the controller or echo reducer.

Figure 3:
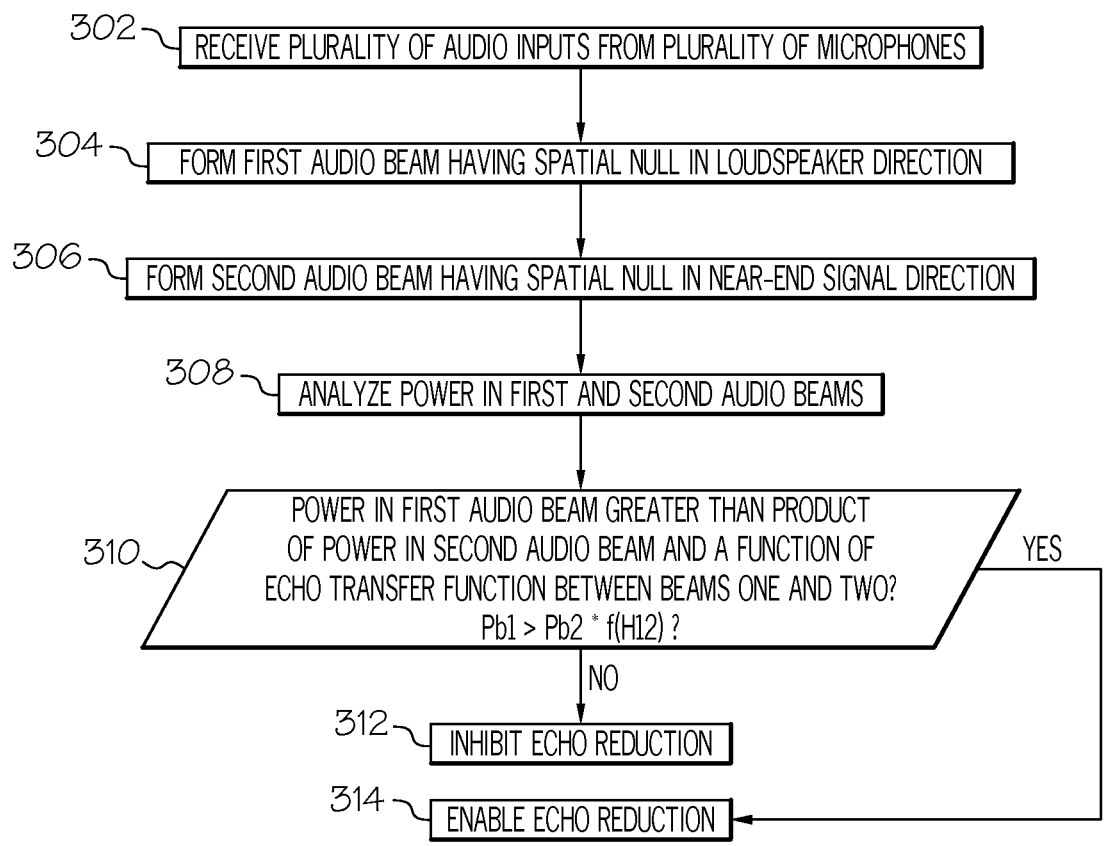
FIG. 3 illustrates a representative flow diagram for an apparatus using a plurality of beamformers for controlling modification of an audio signal.

FIG. 3 illustrates a representative flow diagram for an apparatus using a plurality of beamformers for controlling modification of an audio signal. Step 302 receives a plurality of audio inputs from a corresponding plurality of microphones, the microphones being affixed to device 100 and having a loudspeaker 102. Step 304 forms a first audio beam having a spatial null in the direction of the loudspeaker. Step 306 forms a second audio beam having a spatial null in the near-end signal direction. Step 308 then analyzes the first and second audio beams. Analysis of the first and second audio beams, which correspond to audio signals resulting from beamformers one and two respectively. The analysis may include determining the power in the first audio beam (Pb1) and the power in the second audio beam (Pb2), which may be limited to a narrow frequency range, a broad frequency, or a series of narrow frequency ranges. Step 310 then determines if the power in the first audio beam is greater than the product of the power in the second audio beam and a preset criterion, the preset criterion being a function of the ratio of H1 and H2. Or:

$$Pb1 > Pb2 * f(H12)$$

where Pb1 is the power in the first audio beam, Pb2 is the power in the second audio beam, H12 is the estimated echo transfer function between beamform one and beamform two (H1/H2), and f(H12) is a constant multiplied by H12. For a full-band echo reduction control H12 is a constant representing a fill-band echo loss between beams one and two. For a sub-band (or frequency domain) echo reduction H12 is a constant representing echo loss at each frequency band (or bin). If Pb1 is greater, then in this example, echo reduction is enabled at step 314, else echo reduction is inhibited at step 312.

This example is effective where double-talk, a duplex speakerphone mode, is in a state where both the loudspeaker echo signals and the near-end audio signals are at similar levels. This case can result where acoustic echoes of the speakerphone at loud levels of speakerphone playback of far-end signals are desirable. In the example, beamform one has a beam pattern that is optimized for signal-to-echo ratio (SER). That is the pattern of beamform one is constrained to steer a null in the direction of the loudspeaker while providing for more uniform sound pickup of signals arriving in the direction of the near-end talker. Beamform two has a beam pattern that is optimized for echo-to-interference ratio (EIR) where echo is the desired signal and interference, in this case, is considered to be the near-end signals, because the near-end signals interfere with the detection of the echo signal. Optimizing for EIR improves the estimation of the expected echo level to better facilitate the echo reduction processes. Moreover, this also detects the loudspeaker signal components related to non-linear distortion during loud speakerphone playback. Detecting non-linear loudspeaker distortion provides a more accurate echo estimate at the frequencies of components produced by high volume loudspeaker distortion. Because the level at the output of the first beamformer is predominately from the near-end signal and the level of the output of the second beamformer is predominantly from the echo signal, the double-talk detection analysis can be determined by comparing the ratio of the two beamformer outputs to a threshold. The threshold in this example is a calculation of an approximately constant ratio of the two beamformer responses with respect to the source of the echo, the loudspeaker. The decision for the determination of a double-talk environment becomes the state when the power of beamform one is greater than the power of beamform two multiplied by the threshold, where the threshold is a function of the echo transfer functions of the two beamformers, or H1 and H2. In this example, the threshold is a function of the ratio of H1 and H2, or H1/H2 in full-band or in each frequency band. Alternatively, this threshold is a function of the echo transfer function between the two beamformers. This threshold can be measured offline or estimated dynamically during periods of far-end signal talk. In this example, the ratio is treated as if it is relatively constant because variation in the acoustic echo path between the loudspeaker and each microphone due to changes in the acoustic environment may at least partially compensate for each other at the output of the two beamformers. In this example, echo reduction processes are either enabled or disabled in response to the determination. In other examples, the echo reduction process can be modified in response to the determination.

Figure 4:
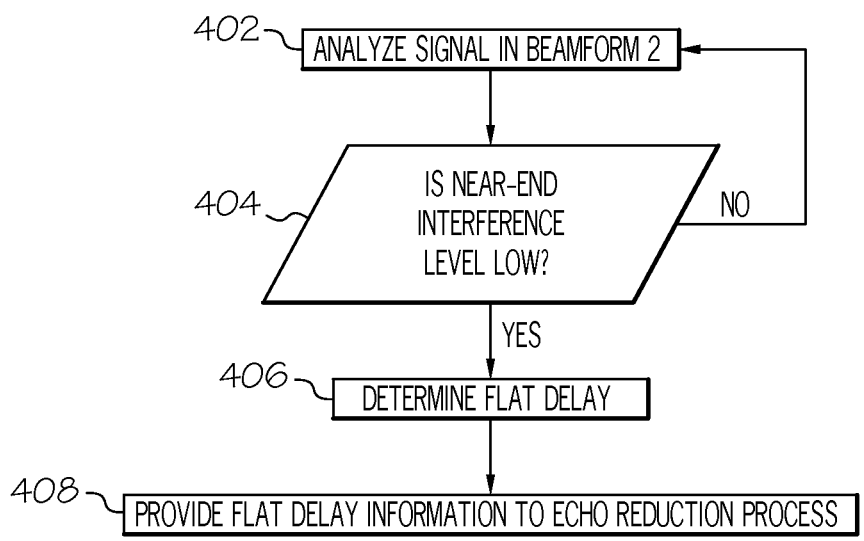
FIG. 4 illustrates a representative flow diagram for an apparatus for modifying an echo reduction process using a beamformed signal.

FIG. 4 illustrates a representative flow diagram for an apparatus modifying an echo reduction process using a beamformed signal. Step 402 analyzes the beamform two to determine if the near-end signal interference level is low at step 404. Since beamform two directs a null towards the near-end signals, the EIR is improved and the echo signal is more detectable than it would be with a non-directional microphone because interference from near-end signals is reduced. Step 406 determines an unknown flat delay corresponding to a delay between the echo reducer reference signal from telephonic interface (270) and the input signals from plurality of microphones (104, 106, 208). The construction and operation of the delay estimator is known to those familiar with the art (see for example, D. Duttweiler, "Subsampling to Estimate Delay with Application to Echo Cancelling" IEEE Transactions On Acoustics and Signal Processing, Vol. ASSP-31, No. 5, October 1983, Y. Le, et. al "Enhancing Echo Cancellation via Estimation of Delay", IEEE Transactions on Signal Processing, Vol. 53, No. 11, November 2005). Step 408 then provides the determined flat delay to the echo reduction process.

Figure 5:
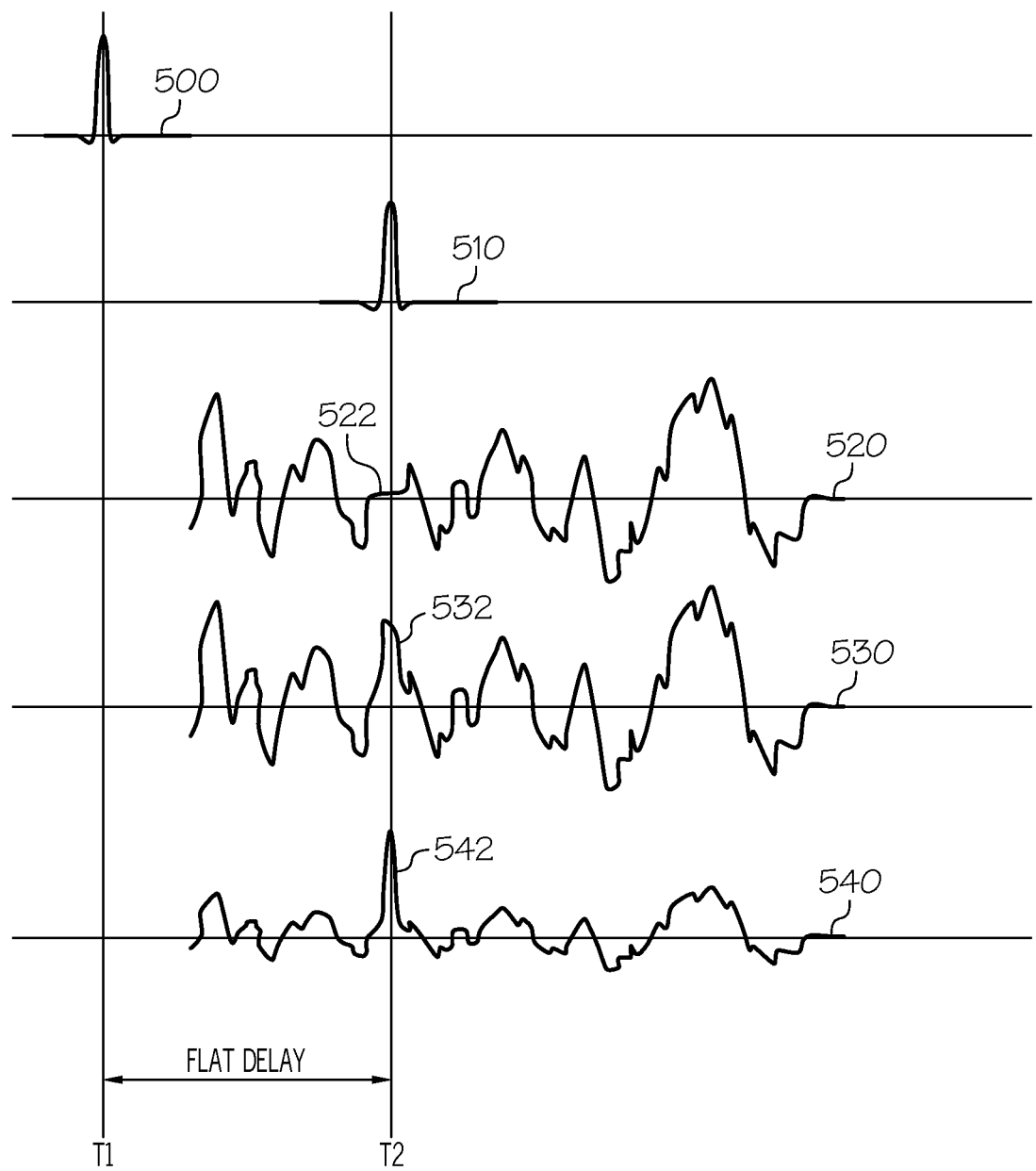
FIG. 5 illustrates representative waveform examples related to the flow diagram of FIG. 4.

FIG. 5 illustrates representative waveform examples related to the flow diagram of FIG. 4. Waveform 500 shows a representative impulse waveform generated at the echo reducer's reference signal point before being processed for playback through the loudspeaker at a time T1. The signal processing (such as: buffering in the DSP) and electrical components between the echo reference point and the loudspeaker (such as amplifiers and digital-to-analog converter) as well as analog-to-digital converter, amplifiers and buffering between the microphone signals and the input to the echo reducer can introduce additional echo path delay. In some acoustic cancellation configurations when the loudspeaker and microphones are arbitrarily placed at relatively far positions from each other, the echo path delay can also incorporate substantial time for the sound waves to propagate from the loudspeaker to the microphones. Waveform 520 shows an example of a waveform resulting from the near-end audio signal present the vicinity of at least one of the plurality of microphones. Impulse waveform 510 is not included in waveform 520. Note that waveform portion 522 shows a substantial flat and low energy component at T2. Waveform 530 shows the combination of waveform 510 and waveform 520 in the vicinity of the speaker phone. Such a waveform may be received by one of the plurality of microphones. Note that waveform portion 532 shows the impulse component 510 added to waveform portion 522. Inspection of waveform 530 shows that the echo component is difficult to distinguish from the near-end component of the signals received by a microphone of the speaker phone because echo component is at approximately the same level as the near-end component and the near-end component interferes with the detection of the echo component. This is also an example of double-talk where the echo signal is at approximately the same level as the near-end signal. Waveform 540 shows a representative waveform received on beamform two. The spatial null in the direction of the near-end signals attenuates the near end signals allowing the echo to have a substantially greater magnitude. This greater magnitude echo signal facilitates the determination of the flat delay, or the delay between T1 and T2, even though the echo signal and the near-end signals are of similar magnitude in the vicinity of the speakerphone. The flat delay can be used by the echo reduction process to either enhance echo reduction or simplify echo processing. For example, some echo canceling processes use an adaptive filter with multiple impulse response taps for modeling a presence of a delayed echo signal at various times. Typically, the output of each tap is processed for an echo signal. However, the output of several taps are known to be zero as a result of the flat delay information provided by the process shown in FIG. 4. By providing the flat delay determined by the process of FIG. 4 to the echo reducer, the processing of taps not closely related to the flat delay can be eliminated. Information related to the flat delay may provide more processing power and additional magnitude and delay information for better echo modeling and echo reduction or suppression determinations in the region of the flat delay, or may provide more processing power for other audio processing or beamforming tasks, or may conserve power and improve the battery life of a battery powered speakerphone.

It should be appreciated that controller 250 and echo reducer 260 may be comprised within an audio processor which also is capable of noise cancellation and determination of non-linearity in the echo signal. The audio processor may use these determinations to further modify the audio signal received by at least one microphone and sent to the far-end of the telephone call.

Figure 6:
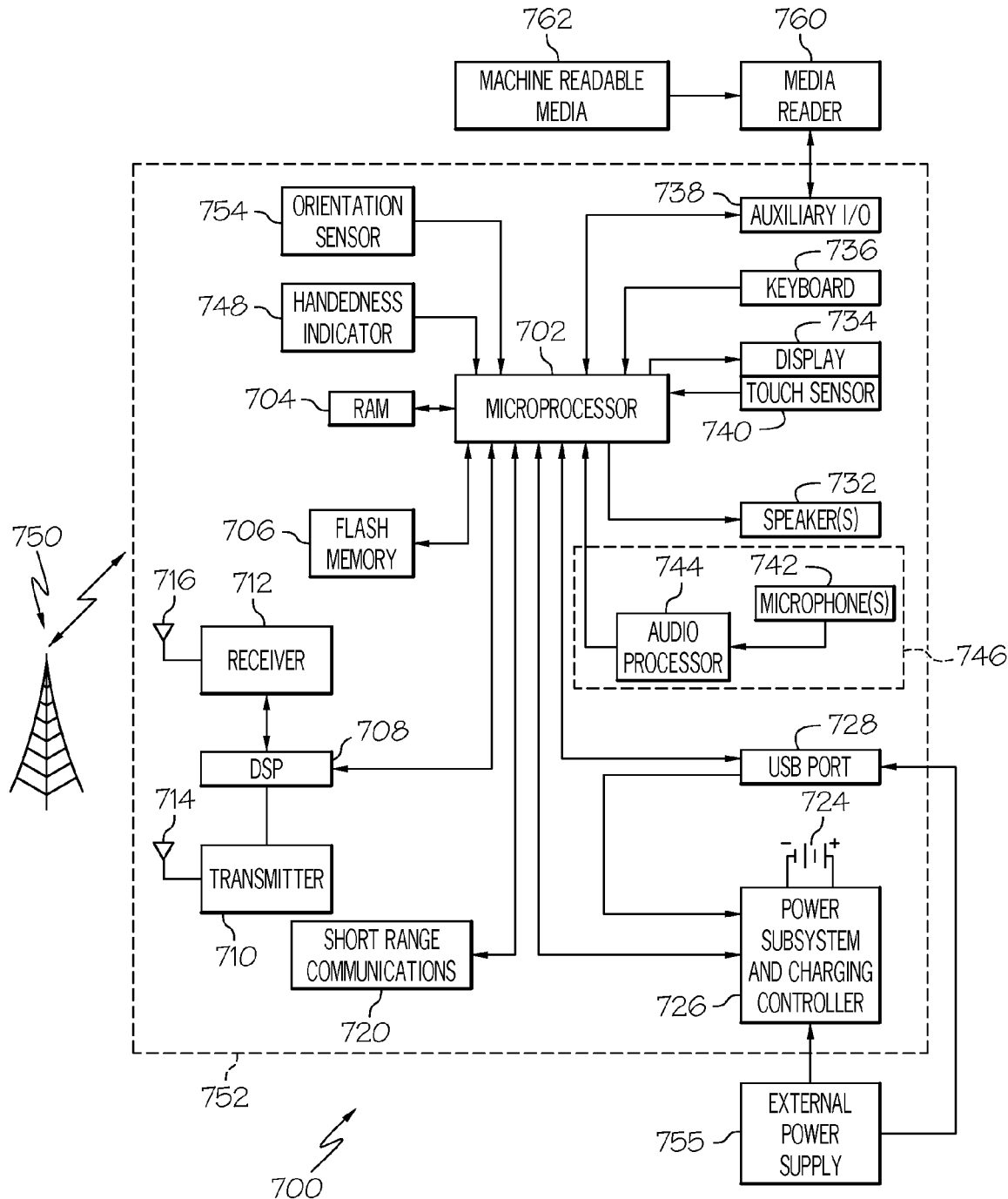
FIG. 6 illustrates a representative block diagram of an electronic device and associated components.

FIG. 6 illustrates a representative block diagram of an electronic device and associated components 700 that is able to include the above described systems and perform the above described methods. In this example, an electronic device 752 is a wireless two-way communication device, such as a smartphone, with voice and data communication capabilities. Such electronic devices communicate with a wireless network 750, which is able to include a wireless voice network, a wireless data network, or both, that use one or more wireless communications protocols. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 752 is an example electronic device that includes two-way wireless communications functions. Such electronic devices incorporate a wireless communication component that includes a wireless communications subsystem including elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the wireless communications network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, USB Port 728, display 734, touch sensor 740, keyboard 736, loudspeaker 732, audio processor 744, a short-range communications subsystem 720, an orientation sensor 754, a handedness indicator 748, a power subsystem and charging controller 726, and any other device subsystems.

The electronic device 752 in one example further includes an orientation sensor 754. Various electronic devices are able to incorporate one or more orientation sensors that include, for example, accelerometer or gyroscope based orientation sensors, light sensors that are located at locations on a case of the electronic device. In some examples, the orientation sensor produces an indication of the current orientation of the electronic device relative to the ground.

The electronic device 752 in one example includes an audio subsystem 746 that includes an audio processor 744, and a plurality of microphones 742. The plurality of microphones may include microphones 104, 106 and optional microphones 208 of FIG. 2. As discussed above, an audio processor 744 in one example receives a voice signal representing echo signals and near-end signals, and performs processing to reduce the echo signal. The audio processor 744 may be an ASIC, FPGA or DSP or other type integrated circuit and be adapted to implement beamformer one, 234, beamformer two 236, controller 250 and echo reducer 260 of FIG. 2.

A power pack 724 is connected to a power subsystem and charging controller 726. The power pack 724 provides power to the circuits of the electronic device 752. The power subsystem and charging controller 726 includes power distribution circuitry for providing power to the electronic device 752 and also contains power pack charging controller circuitry to manage recharging the power pack 724. The power pack includes a battery for making device 752 a battery operated device.

The USB port 728 provides data communication between the electronic device 752 and one or more external devices. Data communication through USB port 728 enables a user to set preferences through the external device or through a software application and extends the capabilities of the device by enabling information or software exchange through direct connections between the electronic device 752 and external data sources rather than through a wireless data communication network. The software exchange can be with microprocessor 702 or audio processor 744 or both as circumstances require.

Operating system software used by the microprocessor 702 is stored in flash memory 706. Further examples are able to use a power pack backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A predetermined set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, USB port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the USB port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a loudspeaker 732 and signals for transmission are generally produced by at least one of the plurality of microphones 742. Alternative voice or audio I/O subsystems, such as a voice message recording subsystem, may also be implemented on the electronic device 752. Although voice or audio signal output is generally accomplished primarily through the loudspeaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 720 is a further optional component which may provide for communication between the electronic device 752 and different systems or devices, which need not necessarily be similar devices. For example, the short-range communications subsystem 720 may include an infrared device and associated circuits and components or a Radio Frequency based communication module such as one supporting Bluetooth® communications, to provide for communication with similarly-enabled systems and devices.

A media reader 760 is able to be connected to an auxiliary I/O device 738 to allow, for example, loading computer readable program code of a computer program product into the electronic device 752 for storage into flash memory 706 or in memory of audio processor 744. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the USB port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of computer instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the scope of the disclosure. The scope of the disclosure is not to be restricted, therefore, to specific embodiments or examples, and it is intended that the appended claims define the scope of the present disclosure.

What is claimed is:

1. An apparatus comprising:
    a plurality of beamformers coupled to a plurality of microphones affixed to a telephone device having a loudspeaker,
        a first of the plurality of beamformers coupled to the plurality of microphones for forming a first audio beam having a spatial null in the loudspeaker direction, and
        a second of the plurality of beamformers coupled to the plurality of microphones for forming a second audio beam having a spatial null in an at least one near-end signal direction; and
    a controller for analyzing the first audio beam and the second audio beam and for controlling a modification of an audio signal received by at least one of the plurality of microphones in response to the analysis.

2. The apparatus according to claim 1 wherein the first audio beam and the second audio beam are concurrently formed and the audio signal modified by the controller is concurrently received by at least one of the plurality of microphones coupled to the plurality of beamformers.

3. The apparatus according to claim 1 wherein the modification of the audio signal includes echo reduction including one of echo suppression and echo cancellation.

4. The apparatus according to claim 1 wherein the audio signal modified by the controller includes an echo signal generated at the loudspeaker, and a near-end signal generated by at least one near-end audio source external to the telephone,
    the first audio beam having a greater amount of near-end signal than the second audio beam, whereby the echo signal interferes with a desired signal included in the near-end signal, thereby providing the first audio beam with a greater signal-to-echo ratio (SER), and
    the second audio beam having a greater amount of echo signal than the first audio beam, whereby the near-end signal interferes with the echo signal and thereby providing the second audio beam with a greater echo-to-interference ratio (EIR), and further wherein
    the controller analyzes the first audio beam and second audio beam to determine if the first audio beam power is greater than a product of the second audio beam power and a threshold.

5. The apparatus according to claim 4 wherein the first audio beam has a first echo to signal ratio (ESR1) and the second audio beam has a second echo to signal ratio (ESR2) wherein the threshold is a function of a ratio of ESR1 and ESR2.

6. The apparatus according to claim 5 wherein the function of the ratio of ESR1 and ESR2 include a first estimate, H1, of ESR1 and a second estimate H2 of ESR2 wherein the threshold is a function of an echo transfer function H12 equivalent to H1 divided by H2.

7. The apparatus according to claim 6 wherein the controller re-estimates at least one of H1 and H2 in response to the EIR of the second audio beam satisfying a preset criterion.

8. The apparatus according to claim 1 wherein the apparatus includes one of circuitry and computer instructions comprised within an integrated circuit.

9. The apparatus according to claim 1 wherein the apparatus includes a portable device including the telephone device, wherein the loudspeaker and the plurality of microphones are affixed to the portable device.

10. The apparatus according to claim 9 wherein the portable device is one of a cell phone, a smartphone and a super phone.

11. A method comprising:
    receiving a plurality of audio inputs from a corresponding plurality of microphones affixed to a telephone device having a loudspeaker;
    forming a first audio beam from the plurality of audio inputs, the first audio beam having a spatial null in the loudspeaker direction;
    forming a second audio beam from the plurality of audio inputs, the second audio beam having a spatial null in at least one near-end signal direction;
    analyzing the first audio beam and the second audio beam; and
    controlling a modification of an audio signal received by at least one of the plurality of microphones in response to the analyzing.

12. The method according to claim 11 wherein the modification includes one of suppressing and canceling an echo in the audio signal in response to the analyzing.

13. The method according to claim 12 wherein the analyzing analyzes a first audio beam power of the first audio beam and a second audio beam power of the second audio beam for controlling the modification.

14. The method according to claim 13 wherein the first audio beam has a first echo to signal ratio (ESR1) and the second audio beam has a second echo to signal ratio (ESR2) and the controlling enables the modification in response to the first audio beam power being greater than a product of the second audio beam power and a function of a ratio of ESR1 and ESR2.

15. The method according to claim 14 wherein the function of the ratio of ESR1 and ESR2 include a first estimate, H1, of ESR1 and a second estimate H2 of ESR2 wherein the function of the ratio of ESR1 and ESR2 is a function of H1 divided by H2.

16. The method of claim 15 wherein the controller determines that the second audio beam has a reduced level near-end signal and re-estimates at least one of H1 and H2.

17. The method according to claim 14 wherein the analyzing further adaptively modifies the estimation of ESR1 and ESR2 in response to analysis of the second audio beam.

18. The method according to claim 12 wherein the analyzing further analyzes the second audio beam for an echo path between the loudspeaker and the plurality of microphones and determining a flat delay in response thereto, and the modification includes at least suppressing or canceling an echo in the audio signal in response to the flat delay.

19. A portable cellular phone with a speakerphone operating mode for facilitating a telephone call between a near-end audio source and a far-end telephonic device, the portable cellular phone comprising:

a loudspeaker affixed to the portable cellular phone for annunciating far-end audio signals from the far-end telephonic device;

a plurality of microphones affixed to the cellular phone for receiving near-end audio signals from the near-end audio source and for receiving an echo signal generated by the loudspeaker;

a first beamformer coupled to the plurality of microphones for forming a first audio beam having a spatial null in the loudspeaker direction;

a second beamformer coupled to the plurality of microphones for forming a second audio beam having a spatial null in an at least one near-end signal direction;

a double-talk detector for analyzing the first audio beam and the second audio beam and for generating an echo reduction control signal in response to a first audio beam power level being greater than a product of a second audio power level and a threshold;

an echo reducer, coupled to at least one of the plurality of microphones receiving a combination of the echo signal and the near end audio signals and for reducing echo signal in response to the echo reduction control signal; and a wireless telephonic interface for wireless coupling to the far-end telephonic device.

20. The portable cellular phone according to claim 19 wherein the first audio beam has a first echo to signal ratio (ESR1) and the second audio beam has a second echo to signal ratio (ESR2) and the double-talk detector reduces the echo signal in response to the first audio beam power being greater than a product of the second audio beam power and a function of a ratio of ESR1 and ESR2.

* * * * *